United States Patent
Miyamoto et al.

(10) Patent No.: US 6,495,052 B1
(45) Date of Patent: Dec. 17, 2002

(54) SYSTEM AND METHOD FOR TREATMENT OF WATER

(75) Inventors: Henry Koro Miyamoto, Toronto (CA); Walsh Michael Edward, Burlington (CA); Marvin Saul Sorokin, Toronto (CA)

(73) Assignee: Ontario Limited, Woodbridge (CA)

( * ) Notice: Subject to any disclaimer, the term of this patent is extended or adjusted under 35 U.S.C. 154(b) by 15 days.

(21) Appl. No.: 09/694,483

(22) Filed: Oct. 24, 2000

(51) Int. Cl.⁷ .................................................. C02F 1/50
(52) U.S. Cl. .................... 210/764; 210/198.1; 210/259; 210/263; 204/232; 204/660
(58) Field of Search ................................. 210/681, 683, 210/764, 198.1, 252, 259, 263; 204/232, 660

(56) References Cited

U.S. PATENT DOCUMENTS

| | | |
|---|---|---|
| 4,048,030 A | 9/1977 | Miller |
| 4,119,518 A | 10/1978 | Miller |
| 4,198,296 A | 4/1980 | Doumas et al. |
| 4,430,226 A | 2/1984 | Hedge et al. |
| 4,474,620 A | 10/1984 | Hall |
| 4,548,716 A | 10/1985 | Boeve |
| 4,761,208 A | 8/1988 | Gram et al. |
| 4,808,287 A | 2/1989 | Hark |
| 4,908,109 A | 3/1990 | Wright |
| 5,007,994 A | 4/1991 | Snee |
| 5,128,043 A | 7/1992 | Wildermuth |
| 5,217,607 A | 6/1993 | Dalton, III et al. |
| 5,223,150 A | 6/1993 | Bundy et al. |
| 5,290,442 A | 3/1994 | Clack |
| 5,342,528 A | 8/1994 | Adachi et al. |
| 5,364,512 A | 11/1994 | Earl |
| 5,573,665 A | 11/1996 | Frommer et al. |
| 5,614,068 A | 3/1997 | Kim |
| 5,635,059 A | 6/1997 | Johnson |
| 5,728,303 A | 3/1998 | Johnson |
| 5,776,346 A | 7/1998 | Fukai |
| 5,792,369 A | 8/1998 | Johnson |
| 5,873,996 A | 2/1999 | Rozelle et al. |
| 5,908,553 A | * 6/1999 | Reid |
| 6,129,841 A | * 10/2000 | Dann |

* cited by examiner

*Primary Examiner*—Betsey Morrison Hoey

(57) ABSTRACT

A system and method is disclosed for treating water to remove suspended solids, disinfect for bacteria and viruses and remove color, taste and odor to produce a potable water. A bactericide is introduced which is relatively stable and long term. The system and method introduces the bactericide to the water in an amount sufficient to kill the bacteria and inactivate viruses, The bactericide is maintained in the water at least for a time period sufficient to kill the bacteria in the water, and, until the water is desired to be consumed at which time the water may be passed through an ion exchange. In this way, there is a decreased likelihood that the water will become recontaminated with the same bacteria and/or viruses before the water is desired to be used. In one embodiment, the bactericide comprises metal ions, such as silver ions and/or copper and zinc ions. In order to introduce the metal ions into the water, the system may comprise an electrode having about 70 percent to 90 percent copper, about 5 percent to 15 percent silver and about 5 percent to 15 percent zinc. Prior to the introduction of the bacteriacide, the water may be treated by passing the water through diatomaceous earth to remove contaminants from the water and/or passing the water through an initial disinfection stage.

22 Claims, 3 Drawing Sheets

SYSTEM AND METHOD FOR TREATMENT OF WATER

FIELD OF THE INVENTION

This invention relates to the treatment of water. More particularly, this invention relates to a system or method for treating water to produce water having biologically acceptable levels of bacteria.

BACKGROUND OF THE INVENTION

In the past, there have been many different types of water treatment methods and systems proposed to treat water in order to remove contaminants and kill bacteria. In particular, it is known in the prior art to introduce bacteriacides to kill bacteria in the water. For example, U.S. Pat. No. 4,198,296 to Doumas proposes a method for treatment of water by passing the water through a media of activated carbon impregnated with silver salts and metallic silver to increase the amount of silver ions $Ag^+$ to a level which can kill the bacteria. The silver ions $Ag^+$ remain in the water for a period of time necessary to kill bacteria, in the order of six minutes. The water can then be further treated and/or filtered prior to human consumption.

However, in many cases, bacteria which can grow in water may be found in several locations. For example, bacteria which grow in water may be airborne or may be found on surfaces within the actual water treatment system and re-contaminate the water. Furthermore, there is always the possibility that not all of the bacteria in the water has been killed, such that the remaining bacteria may continue to multiply while the water is being held for later use. Therefore, water which has been subjected to disinfection and treated to kill bacteria, may become recontaminated with the same bacteria which were killed by the disinfection. This is particularly likely in warm environments where bacteria and viruses are known to grow faster and be airborne in greater amounts. This may also occur in environments and/or countries which have poor sanitation and may have more bacteria, both airborne bacteria and non-airborne, throughout the environment.

Furthermore, many prior art devices and methods require a long holding time to permit the bacteriacide to kill the bacteria and viruses. This decreases the efficiency of the overall water treatment system, and, requires large amounts of water to be treated at any one time so as to ensure a sufficient supply of treated water when desired.

In some prior art water treatment systems, ultraviolet light is sometimes used substantially immediately before the water is consumed to kill any bacteria which may have recontaminated the water while it was being held for consumption. However, ultraviolet treatment occasionally does not kill all of the bacteria in the water, depending on the intensity of the ultraviolet light, the characteristics of the water itself (i.e. colour, turbidity, organic content), and, the quantity of bacteria in the water. Furthermore, ultraviolet light tends to be inconsistent and bacteria and viruses may not always be exposed to all of the water as it passes in front of the ultra violet light source.

Accordingly, there is a heed in the art for a system and method to treat water so as to ensure a supply of water having biologically acceptable levels of bacteria by killing bacteria in water, and also preventing recontamination of the water before the water is desired to be consumed. There is also a need in the art to quickly treat water so as to rapidly kill bacteria, thereby ensuring a ready supply of treated water. Quickly treating water to rapidly destroy bacteria also avoids the need for large holding containers which are used to treat large amounts of water to ensure water is available at any particular time, and, increases the efficiency of the overall system.

SUMMARY OF THE INVENTION

Accordingly, it is an object of this invention to at least partially overcome the disadvantages of the prior art. Also, it is an object of this invention to provide an improved type of water treatment system and method which ensures a supply of water having a biologically acceptable level of bacteria when the water is desired to be consumed by ensuring the bacteria which are killed do not recontaminate the water supply.

Accordingly, in one of its aspects, this invention resides in a method for treating water for human consumption comprising the steps of: (a) introducing a bacteriacide to the water in an amount sufficient to kill bacteria in the water; (b) maintaining the bacteriacide in said water until the water is desired to be consumed and at least for a period of time sufficient to kill the bacteria in the water; (c) once the water is desired to be consumed, decreasing the amount of the bacteriacide in the water to a biologically acceptable amount for human consumption.

In a further aspect, this invention resides in a system for treating water for human consumption comprising: a container for holding the water until the water is desired for human consumption; means for introducing a bacteriacide to the water in the container in an amount sufficient to kill bacteria in the water; means for decreasing the bacteriacide to a biologically acceptable level when the water is desired to be consumed; wherein the bacteriacide is maintained in the water in the container in an amount sufficient to kill bacteria in the water and to prevent recontamination of the water by bacteria until the water is desired to be consumed.

One advantage of the present invention is that maintaining the bacteriacide in the water for an extended period of time will ensure that all the bacteria and viruses have been killed before consumption. Furthermore, maintaining the bacteriacide in the water until substantially immediately before the water is desired to be consumed, decreases the likelihood that the water will become recontaminated with the same bacteria and viruses. In addition, maintaining the bacteriacide in the water until substantially immediately before the water is desired to be consumed, decreases the ability of any bacteria which may have survived the bacteriacide, to reproduce in substantial quantities.

A further advantage of the present invention is that the same disinfecting treatment which is used to initially kill the bacteria is also used to prevent recontamination of the bacteria. Accordingly, the present invention provides a cost savings over other water treatment systems and methods which require a secondary type of water treatment method, such as ultraviolet radiation, in addition to the primary type of water treatment used to initially kill the bacteria.

A further advantage of the present invention is that the bacteriacide, in a preferred embodiment, is a silver ion $Ag^+$ which can be introduced rapidly by means of a silver containing electrode. This provides rapid dissemination of silver ions throughout the water in order to rapidly kill the bacteria, thus decreasing the time required to treat the water and increasing the overall efficiency of the system.

A further advantage of the present invention is that the silver ions $Ag^+$ may be removed by passing the water through an ion exchange to remove the silver ions $Ag^+$. The ion exchange removes the silver ions $Ag^+$, which have acted as the bacteriacide, and further removes other ions and contaminants in the water in addition to the silver ions $Ag^+$. Furthermore, the silver ions $Ag^+$ removed by the ion exchange can then be extracted and recycled in new electrodes for later use.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
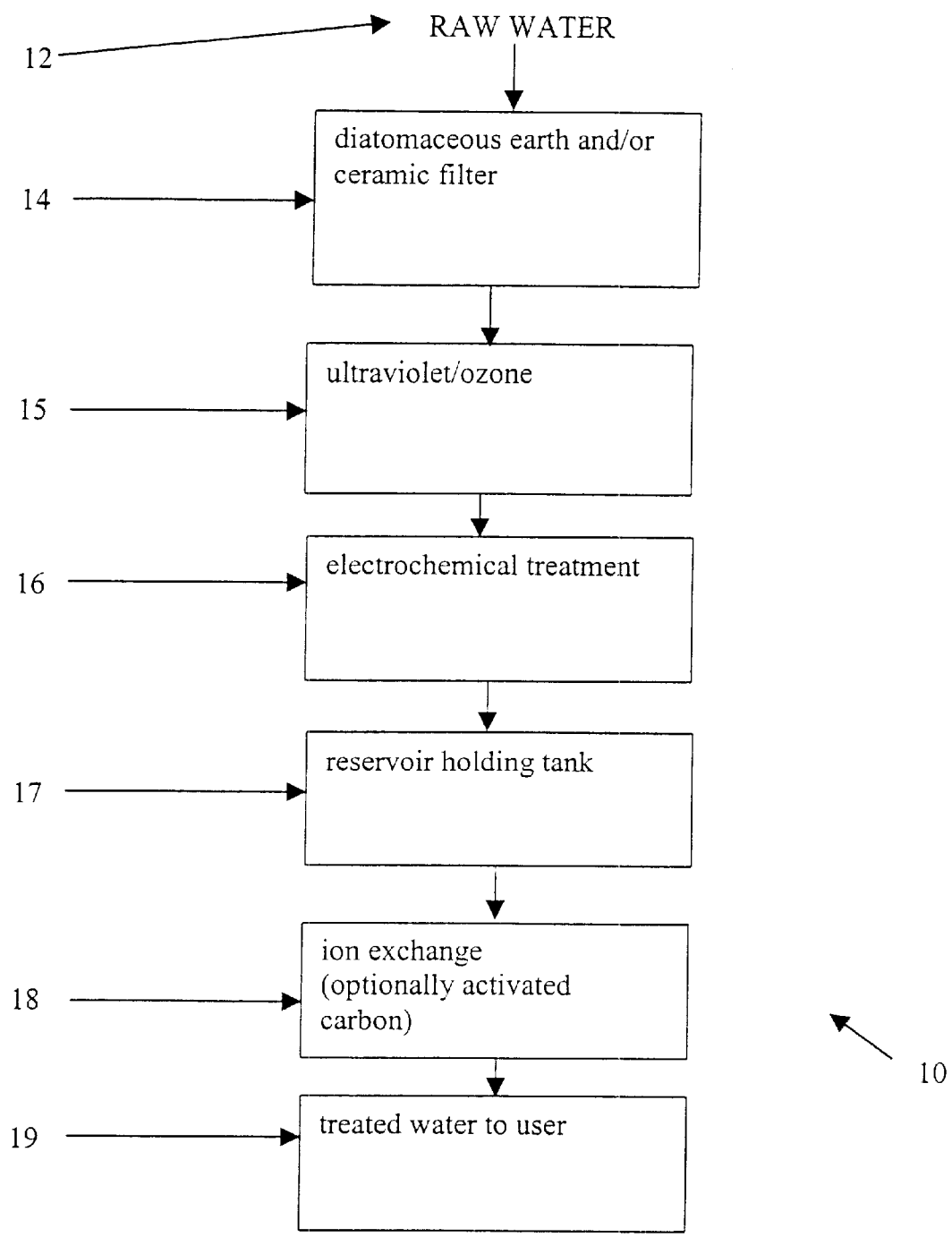
FIG. 1 shows a system for treating water according to one embodiment of the present invention.

As shown in FIG. 1, one preferred embodiment of the present invention relates to a system, shown generally by reference numeral 10, for treating water for human consumption. As illustrated in FIG. 1, raw water, shown generally by reference numeral 12, enters the system 10 at one end of the system 10 to be treated.

As a preliminary treatment step, the raw water 12 is passed through an initial filtering stage 14. The initial filtering stage 14 may comprise diatomaceous earth and/or ceramic filters. The specific type of preliminary filtering depends on the raw water 12 entering into the system 10 and may be altered as known by persons skilled in the art. The diatomaceous earth and/or ceramic filters preferably provide an initial removal of Giardia cysts and Cryptosporidia cysts and other protozoan cysts. The preliminary filtering stage 14 will also remove other contaminants from the water.

Optionally, the water 12 may be passed through a further or secondary preliminary filtering stage 15 which comprises ultraviolet light and/or ozone treatment, depending on the type of contaminants originally present in the raw water 12. The second preliminary stage 15 is optional and may provide an initial disinfection for bacteria and viruses and/or colour reduction in cases where the raw water 12 is expected to contain large amounts of bacteria and/or viruses.

Once the preliminary filtering stages 14, 15 are concluded, the partially treated water 12 passes through the electrochemical treatment stage 16. At the electrochemical treatment stage 16, a bactericide is introduced into the water 12. Preferably, the bactericide will be introduced in amounts sufficient to kill the bacteria in the water 12. Depending on the specific application, the bactericide may be introduced in a higher concentration in order to rapidly kill the bacteria, for example in cases where the system 10 is used for home use and the treated water 19 is desired rapidly, or, in lower concentrations, such as in industrial or municipal uses where large amounts of treated water 19 is desired but not rapidly.

In either case, once the bactericide is introduced at the electrochemical treatment stage 16, the water 12 is sent to a reservoir holding tank 17. The water 12 containing the bactericide will be held in the reservoir holding tank 17 at least for a period of time sufficient to kill the bacteria in the water.

The amount of time the water 12 is held in the reservoir holding tank 17 will be a function of the concentration of the bactericide and the initial level of bacteria in the water 12. For example, in one embodiment, the bacteriacide comprises silver ions at a concentration of about 0.03 mg/L. In this concentration, the water 12 must be contained in the reservoir holding tank 17 with the silver ions for a period of time of at least eight hours to ensure sanitation.

However, even after this period required to kill the bacteria, the bactericide will be maintained in the reservoir holding tank 17 until the water is required to be used. In other words, even after the period of time sufficient to kill the bacteria in the water has passed, the water 12 will be maintained with the bactericide in the reservoir holding tank 17 until the water 12 is desired to be consumed In this way, recontamination of the water by bacteria and/or viruses can be prevented as the bactericide remains present in the water 12 until the water 12 is desired to be consumed.

Once the water 12 is desired to be consumed or otherwise used, the water 12 from the reservoir holding tank stage 17 is passed to an ion exchange stage 18. In cases where the bactericide is a metal ion, the ion exchange stage 18 removes the bactericide to a biologically acceptable amount for human consumption or otherwise by exchanging the metal ions with other less harmful ions. The treated water 19 is then sent to the user. In this way, a bactericide, preferably comprising metal ions, is maintained in the water 12 for a period of time required to kill the bacteria in the water, and, also until the water 12 is desired to be used or consumed. In this way, recontamination of the water by the bacteria is prevented. Optionally, the system 10 may also comprise an activated carbon filter in combination with the ion exchange stage 18 to remove colour, taste and odour, as is known in the art.

Preferably, the bactericide comprises metal ions. In this case, introduction of metal ions as a bactericide can be accomplished at the electrochemical treatment stage 16 in an efficient and controllable manner. Furthermore, the metal ions can be maintained in the water until the water is desired to be used or consumed and at least for a period of time sufficient to kill the bacteria in the water. The metal ions can then be removed in an efficient manner through an ion exchange stage 18, or other known manners of removing metal ions from water.

In addition to the metal ions of the bactericide, the ion exchange stage 18 will also remove other metal ions contained in the water 12 not previously removed by the preliminary stages 14, 15. A further advantage of use of the ion exchange 18 is that the recaptured metal ions from the bactericide can be recycled into new electrodes and reused at the electrochemical treatment stage 16. While this may not be economical for some metals, it is preferable to do so in order to preserve the environment. Moreover, in a preferred embodiment, the bactericide comprises silver ions $Ag^+$. To introduce silver ions $Ag^+$ into the water 12, a silver containing electrode must be used, and, given the value of silver at present, removal and recycling of the silver ions at the ion exchange stage 18 may be economical.

Figure 2A:
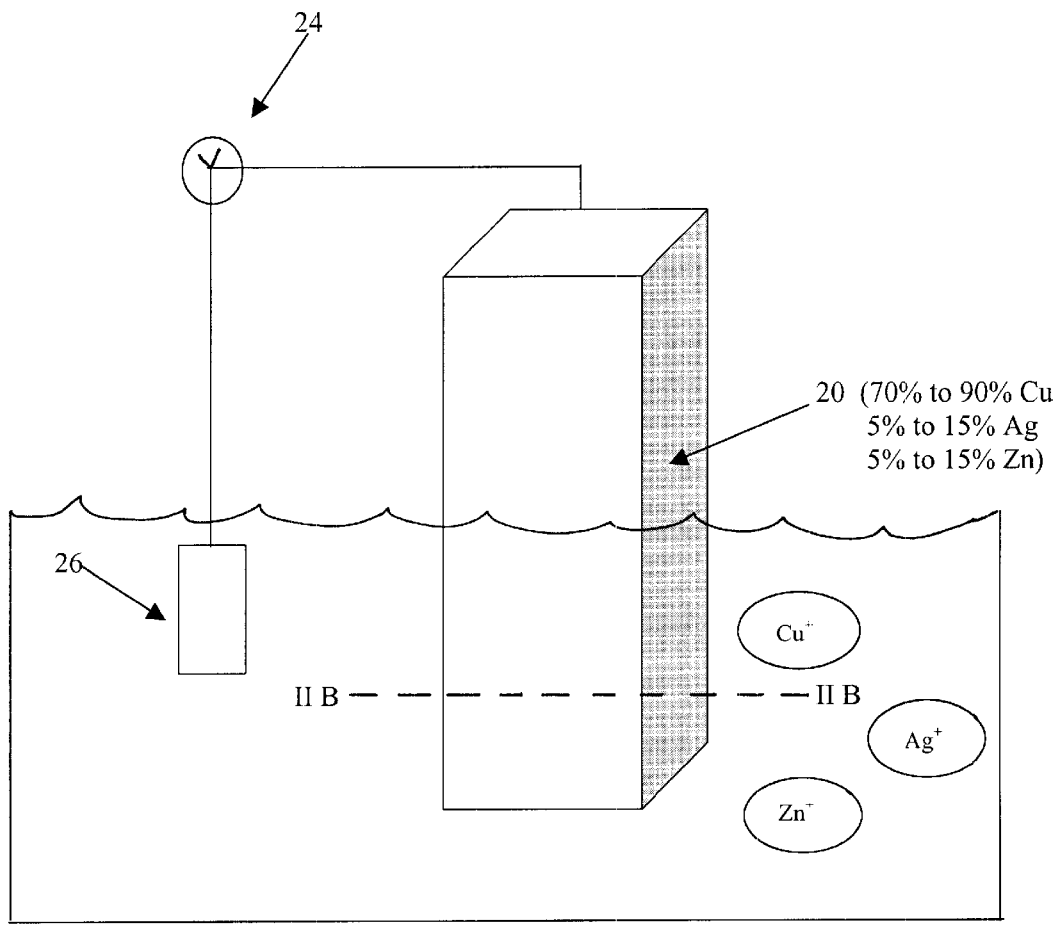
FIG. 2A shows an electrode comprising copper, silver and zinc for use in the electrochemical disinfection stage according to one embodiment of the invention.
Figure 2B:
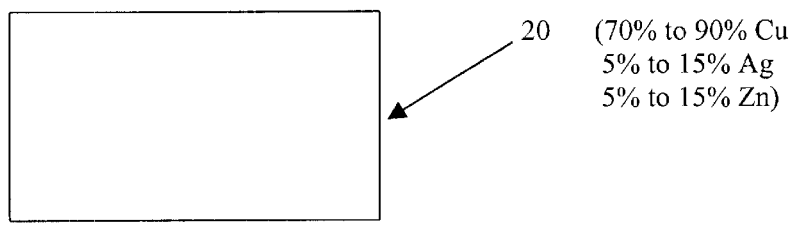
FIG. 2B shows a cross-section of the electrode illustrated in FIG. 2A along section line IIB—IIB.

FIGS. 2A and 2B show an electrode according to one embodiment of the present invention. The electrode, illustrated generally in FIGS. 2A and 2B by reference numeral 20, preferably comprises about 70 percent to 90 percent copper, about 5 percent to 15 percent silver and about 5 percent to 15 percent zinc. In these concentrations, it has been found that copper ions, silver ions and zinc ions can be efficiently introduced into the water 12 at concentrations sufficient to kill a variety of bacteria and algae. These concentrations can range from 0.3 to 1.0 mg Cu/L, 0.01 to 0.05 mg Ag/L and 0.01 to 0.05 mg Zn/L.

As also illustrated in FIG. 2A, the electrode 20 is placed within the semi-treated water, illustrated by reference numeral 22 in FIG. 2A, which water 22 is contained within the holding tank or container 28. A voltage 24 is applied between the copper, silver and zinc electrode 20 and a secondary electrode 26. By applying the voltage 24 across the copper, silver and zinc electrode 20 and the secondary electrode 26, the copper, silver and zinc ions can be introduced into the water 22 and act as a bactericide and algaecide.

FIG. 2B shows the copper, silver and zinc electrode 20 in cross-section along section line IIB. As illustrated in FIG. 2B, the copper, silver and zinc electrode 20 preferably comprises an alloy of about 70 percent to 90 percent copper, about 5 percent to 15 percent silver and about 5 percent to 15 percent zinc and is relatively homogenous in order to permit controlled introduction of the copper, silver and zinc metal ions into the water 22 to act as a bactericide. In a preferred embodiment, the electrode has about 70 percent copper, about 15 percent silver and about 15 percent zinc, but the composition of the electrode may vary slightly, such as by ±5 percent without marked decrease in the performance of the electrode 20.

Figure 3A:
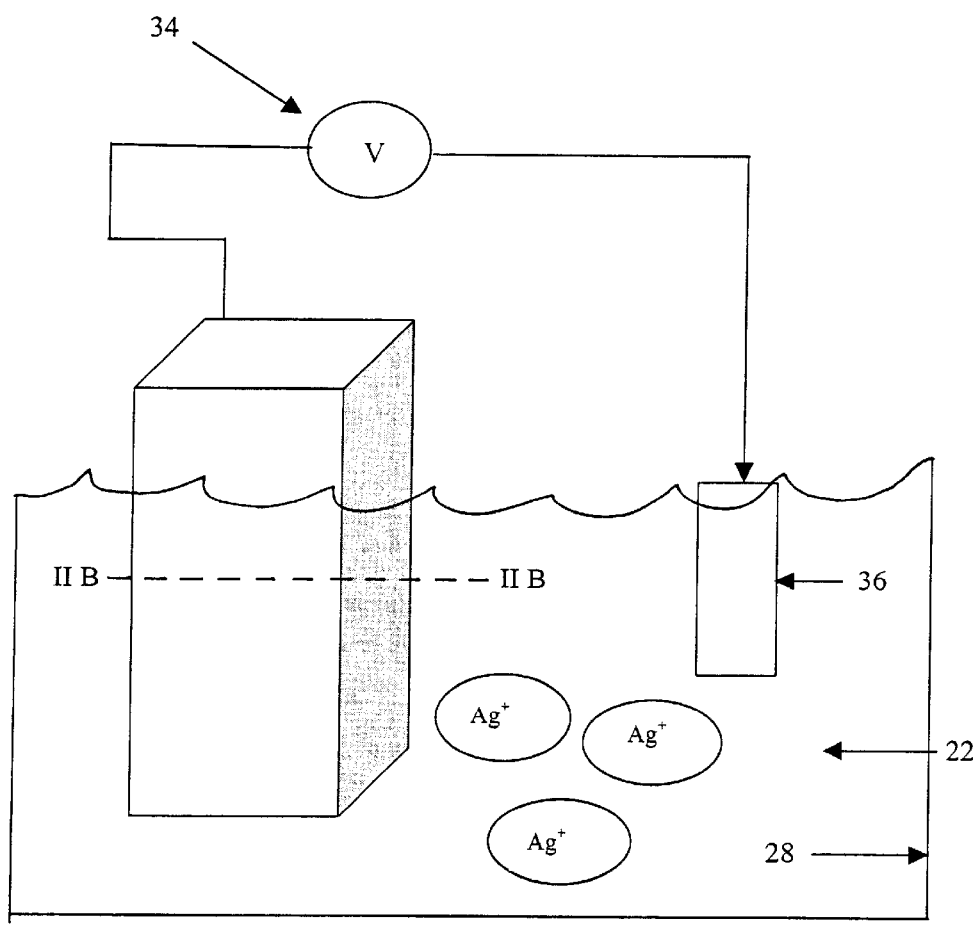
FIG. 3A shows an electrode comprising a substantially pure silver for use in the electrochemical disinfection stage according to a further embodiment of the present invention.
Figure 3B:
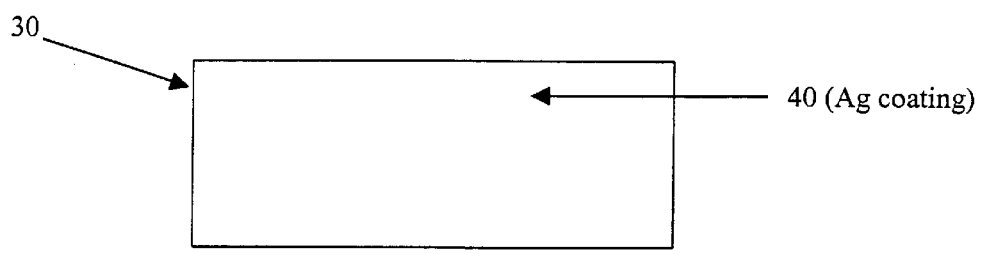
FIG. 3B shows a cross-section of the electrode illustrated in FIG. 3A along section line IIB—IIB.

FIGS. 3A and 3B show an electrode 30 having a silver containing coating. The silver containing coating electrode 30 acts in a similar manner to the copper, silver and zinc electrode 20 illustrated in FIG. 2A and 2B, but only introduces silver ions $Ag^+$ to the water. The silver containing electrode 30 is preferably used in environments where the raw water 12 does not contain algae so that silver ions $Ag^+$ alone in the water 22 can kill the bacteria and inactivate viruses.

As illustrated in FIG. 3A, this embodiment also comprises a second electrode 36 and a voltage 34 applied between the silver containing electrode 30 and the second electrode 36 in order to introduce the silver ions $Ag^+$ from the electrode 30 into the semi-treated water 22.

FIG. 3B shows the silver containing electrode 30 in cross-section. As illustrated in FIG. 3B, the silver containing electrode 30, in one preferred embodiment, comprises substantially pure silver Ag. A substantially pure silver Ag electrode 30 has been found to have the required degree of support and electroconductivity to introduce silver ions $Ag^+$ into the semi-treated water 22 in an effective and controllable manner. It is understood that the silver containing electrode 30 may be an alloy of silver, provided silver ions $Ag^+$ can be introduced into the semi-treated water 22 without any other counter-productive metal ions being introduced. In another embodiment (not shown), the silver containing electrode 30 may have a main supportive and conductive core (not shown) made from a material less expensive than silver to decrease the cost of the electrode 30. In this embodiment, the core (not shown), comprises mild steel 42 or other electroconductive materials.

It is understood that if a substantially pure silver Ag electrode 30 is used, the silver electrode 30 can be used for a substantial period of time to introduce silver ions $Ag^+$ into the semi-treated water 22 without requiring replacement. Also, as indicated above, the silver ions $Ag^+$ will be recaptured at the ion exchange stage 18 and may be recycled and reused into new silver containing electrodes 30.

In cases where the semi-treated water 22 is to be contained in a container 28 for an extensive period of time and a silver containing electrode 30 is used, it is preferable that the silver is introduced into the water at a concentration of about 0.03 mg/L as discussed above. In cases where the water may be desired to be used relatively quickly, such as within ten minutes, the concentration of silver ions $Ag^+$ in the semi-treated water 22 may be increased, for example, to a level of one part per million silver ions $Ag^+$. In this case, the water must be maintained in the holding tank or container 28 for at least ten minutes to kill bacteria, and will be contained until the water is desired to be used in order to ensure that the semi-treated water 22 does not become recontaminated with bacteria before use by the user.

The following tables 1, 2 and 3 show a disinfection study based on water introduced from locations in and around Ontario, Canada including Ashbridges Bay (Table 1), Grenadier Pond (Table 2) and the Humber River (Table 3). The water taken from these sources was introduced as raw water 12 into a system similar to that illustrated in FIG. 1. However, only diatomaceous earth was used as a preliminary stage 14, and, no type of initial disinfection stage 15 was used. Furthermore, the ion exchange stage 18 comprised an activated carbon filter. The water was contained in the container for a period of time. The following are Tables 1, 2 and 3 showing the results of the experiments.

TABLE 1

Source: Ashbridges Bay

| Parameter (mg/L unless stated) | Un-treated | After Diatomaceous Earth Filtration | After Silver Electrodes | After Activated Carbon/ Ion Exchange | Percentage of Overall Removal |
|---|---|---|---|---|---|
| Escherichia Coli/100 mL | 1500 | 1200 | 176 | 0.00 | 100 |
| Fecal Streptococci/ 100 mL | 260 | 200 | 8 | 0.00 | 100 |
| Cryptosporidium oocyst/100 L | 70 | Not Detectable | | | 100 |
| Giardia cysts/ 100 L | Not Detectable | Not Detectable | | | |
| Silver | Below Detection | Below Detection | 0.0031 | Below Detection | 100 |
| Copper | Below Detection | Below Detection | 0.0039 | Below Detection | 100 |
| Iron | 0.007 | 0.069 | 0.133 | 0.03 | 80 |
| Chemical Oxygen Demand | 27 | 27 | 32 | 17.67 | 45 |
| Total Suspended Solids | 4 | 5 | 6 | 2 | 67 |
| Conductivity | 348 | 354 | 362 | Below Detection | 100 |
| Colour (TCU) | 86 | 13 | 11 | Below Detection | 100 |
| Total Mercury | <0.0001 | <0.0001 | <0.0001 | Below Detection | 100 |

TABLE 2

Source: Grenadier Pond

| Parameter (mg/L unless stated) | Un-treated | After Diatomaceous Earth Filtration | After Silver Electrodes | After Activated Carbon/Ion Exchange | Percentage of Overall Removal |
|---|---|---|---|---|---|
| Escherichia Coli/100 mL | 4 | Below Detection | 0 | 0 | 100 |
| Fecal Streptococci/100 mL | 8 | Below Detection | Below Detection | 0 | 100 |
| Cryptosporidium oocyst/100 L | 640 | Below Detection | | | 100 |
| Giardia cysts/100 L | Not Detectable | Below Detection | | | |
| Silver | 0.0016 | <0.0015 | <0.0015 | Below Detection | 100 |
| Copper | 0.008 | <0.0021 | 0.003 | 0.00 | 100 |
| Iron | 0.016 | <0.003 | 0.006 | Below Detection | 100 |
| Chemical Oxygen Demand | 35 | 30 | 33 | 19.33 | 45 |
| Total Suspended Solids | 11 | 3 | 2 | 2.69 | 76 |
| Conductivity | 1330 | 1230 | 1320 | 10.97 | 99 |
| Colour (TCU) | 28 | 13 | 14 | Below Detection | 100 |
| Total Mercury | <0.0001 | <0.0001 | <0.0001 | Below Detection | 100 |

TABLE 3

Source: Humber River

| Parameter (mg/L unless stated) | Un-treated | After Diatomaceous Earth Filtration | After Silver Electrodes | After Activated Carbon/Ion Exchange | Percentage of Overall Removal |
|---|---|---|---|---|---|
| Escherichia Coli/100 mL | 400 | 400 | 20 | 0.00 | 100 |
| Fecal Streptococci/100 mL | 112 | 130 | 32 | 0.00 | 100 |
| Cryptosporidium oocyst/100 L | 1750 | 117 | | | |
| Giardia cysts/100 L | Not Detectable | Not Detectable | | | |
| Silver | 0.0036 | <0.0015 | <0.0015 | Below Detection | 100 |
| Copper | <0.0021 | 0.0049 | 0.0059 | Below Detection | 100 |
| Iron | 0.396 | 0.163 | 0.164 | 0.08 | 79 |
| Chemical Oxygen Demand | 40 | 28 | 24 | 18.13 | 54 |
| Total Suspended Solids | 4 | 7 | 4 | 2.33 | 42 |
| Conductivity | 750 | 755 | 756 | 14.87 | 98 |
| Colour (TCU) | 21 | 21 | 21 | 3 | 86 |
| Total Mercury | <0.0001 | <0.0001 | <0.0001 | Below Detection | 100 |

As shown in Tables 1, 2 and 3, the system 10 comprising silver containing electrodes 30 successfully decreased the concentrations of bacteria and other contaminants. In particular, as illustrated in FIGS. 1 and 2, *Escherichia Coli, Fecal Streptococci, Cryptosporidium oocyst* and *Giardia cysts* were removed by 100 percent. As shown in Table 3, raw water 12 taken from the Humber River also showed a substantial decrease in all of these bacteria. Furthermore, the other stages in the system 10, and in particular the ion exchange stage 18, as well as the preliminary diatomaceous earth stage 12, removed the other contaminants from the untreated water 12 to produce treated water 19. More particularly, it is apparent that removal of the bacteria by 100 percent also, implicitly, illustrates that the water 19 did not become recontaminated with the same bactericides before the water could be used by a user.

Accordingly, as illustrated at least by the above tables, the system 10 illustrated in FIG. 1 can be used to remove several contaminants from the raw water 12. In particular, diatomaceous filtration 14 can remove substantially all suspended solids, as well as much of the *Escherichia Coli, Fecal Streptococci, cryptosporidium oocyst* and *Giardia cysts*. Use of a bactericide, such as silver ions $Ag^+$, which are introduced through electrochemical treatment 16, can then kill the remaining bacteria and inactivate the viruses. The ion exchange and activated carbon 18 then removes the silver ions $Ag^+$, as well as other metal ions, and removes odour, offensive tastes and colour to produce potable water.

In a preferred embodiment, as described above and illustrated in the drawings, the bactericide comprises metal ions. In particular, the bactericide preferably comprises silver ions $Ag^+$, and, depending on the nature of the raw water 12, may also comprise copper ions $Cu^{++}$ and zinc ions $Zn^{++}$. However, it is understood that the present invention is not limited to a bactericide or virucide comprising these specific metal ions, but rather other types of metal ions may also be used as bactericides and virucides.

Furthermore, it is understood that the invention is not limited to bactericides comprising metal ions, Rather, the bacteriacide may comprise other types of substances that can kill bacteria. However, in this case, a device other than an ion exchange may be required to remove the bactericide from the water when the water is desired to be used.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invent on includes all embodiments which are functional, electrical, chemical or mechanical equivalents of the specific embodiments and features that have been described and illustrated herein.

The embodiments of the invention in which an exclusive property or privilege is claimed are defined as follows:

1. A method for treating water for human consumption comprising the steps of:
    (a) introducing a bactericide comprising metal ions to the water by applying a voltage to an electrode sufficient to introduce metal ions into the water from the electrode in an amount sufficient to kill bacteria in the water;
    (b) maintaining the bactericide comprising metal ions in said water until the water is desired to be consumed and at least for a period of time sufficient to kill the bacteria in the water;
    (c) once the water is desired to be consumed, decreasing the amount of the bactericide in the water to a biologically acceptable amount for human consumption.

2. A method defining claim 1 wherein step (a) of introducing the bactericide includes the step of introducing the bactericide in an amount sufficient to rapidly kill the bacteria.

3. The method as defined in claim 1 wherein the electrode contains silver, and, the bactericide comprises silver ions, such that step (a) comprises applying the voltage to the electrode containing silver sufficient to introduce the silver ions into the water from the electrode in an amount sufficient to kill the bacteria in the water.

4. The method as defined in claim 3 wherein silver ions are introduced into the water to a concentration of 1 part per million (ppm).

5. The method as defined in claim 3 wherein step (c) of decreasing the concentration of the bactericide in the water includes the step of passing the silver ion containing water through an ion column to decrease the amount of the silver ion to the biologically acceptable amount for human consumption.

6. The method as defined in claim 5 wherein the ion column also removes other metal ions in the water.

7. The method as defined in claim 5 wherein the silver ions also inactivate viruses in the water.

8. The method as defined in claim 5 wherein the electrode comprises 70 percent to 90 percent copper, 5 percent to 15 percent silver and 5 percent to 15 percent zinc by weight and the bactericide comprises copper ions, silver ions and zinc ions.

9. The method as defined in claim 8 further comprising the preliminary steps of:
(i) passing the water through diatomaceous earth to remove contaminants from the water; and
(ii) passing the water through an initial disinfection stage after the water is passed through the diatomaceous earth.

10. A system for treating water for human consumption comprising:
a container for holding the water until the water is desired for human consumption;
means for introducing a bactericide to the water in the container comprising a metal electrode such that applying a voltage to the electrode while the electrode is placed in the water introduces metal ions into the water from the electrode in an amount sufficient to kill bacteria in the water;
means for decreasing the bactericide to a biologically acceptable level when the water is desired to be consumed;
wherein the bactericide is maintained in the water in the container in an amount sufficient to kill bacteria in the water and to prevent recontamination of the water by bacteria until the water is desired to be consumed.

11. The system as defined in claim 10 wherein the bactericide comprises copper ions in a concentration of about 0.3 to 1.0 ppm, silver ions in a concentration of about 0.01 to 0.05 ppm and zinc ions in a concentration of about 0.01 to 0.05 ppm.

12. The system as defined in claim 10 wherein the bactericide comprises silver ions, and, the electrode contains silver such that applying the voltage to the electrode containing silver while the electrode is placed in the water introduces silver ions into the water from the electrode in an amount sufficient to kill bacteria in the water.

13. The system as defined in claim 12 further comprising:
a diatomaceous earth stage and an initial disinfection stage;
wherein the water passes through the diatomaceous earth stage and the initial disinfection stage prior to entering the container.

14. The system as defined in claim 12 wherein the means for decreasing the bactericide to a biological acceptable level comprises an ion column which decreases the concentration of the silver ion in the water.

15. The system as defined in claim 12 wherein the silver ions also inactivate viruses in the water.

16. The system as defined in claim 12 wherein the electrode comprises 70 percent to 90 percent copper, 5 percent to 15 percent silver and 5 percent to 15 percent zinc by weight.

17. The system as defined in claim 1, wherein the silver ions are introduced into the water to a concentration of about 1 ppm.

18. A system for treating water for human consumption comprising:
a container for holding the water until desired for human consumption;
an electrochemical disinfection device for introducing a bactericide comprising metal ions to the water in the container in an amount sufficient to kill bacteria in the water;
an ion column for decreasing the concentration of the bactericide in the water by decreasing the concentration of the metallic ions to a biologically acceptable amount for human consumption;
wherein the bactericide is maintained in the water in the container in an amount sufficient to prevent recontamination of the water by bacteria until the water is desired to be consumed.

19. The system as defined in claim 18 wherein the bactericide comprises cooper ions in a concentration of about 0.3 to 1.0 ppm, silver ions in a concentration of about 0.01 to 0.05 ppm and zinc ions in a concentration of about 0.01 to 0.05 ppm.

20. The system as defined in claim 19 wherein the electrochemical disinfection device comprises an electrode comprising 70 percent to 90 percent copper, 5 percent to 15 percent silver and 5 percent to 15 percent zinc by weight.

21. The system as defined in claim 18 wherein the bactericide comprises silver ions and the electrochemical disinfection device comprises an electrode containing silver while the electrode is placed in the water introduces silver ions into the water from the electrode in an amount sufficient to kill bacteria in the water.

22. The system as defined in claim 21 wherein the silver ions also act as a virucide to inactivate viruses in the water.

* * * * *